(12) United States Patent
Bossen et al.

(10) Patent No.: US 6,199,171 B1
(45) Date of Patent: Mar. 6, 2001

(54) TIME-LAG DUPLEXING TECHNIQUES

(75) Inventors: Douglas Craig Bossen; Arun Chandra, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/105,601

(22) Filed: Jun. 26, 1998

(51) Int. Cl.[7] .................................................. G06F 13/00
(52) U.S. Cl. ................................... 714/2; 714/12; 714/21
(58) Field of Search ................................... 714/5, 11, 12, 714/14, 22, 1, 2, 3, 10, 15, 17, 16, 31, 21

(56) References Cited

U.S. PATENT DOCUMENTS

| | | | |
|---|---|---|---|
| 5,446,872 | * 8/1995 | Ayres et al. ............................. 714/1 |
| 5,491,792 | * 2/1996 | Grisham et al. ....................... 714/39 |
| 5,608,866 | * 3/1997 | Horikawa ............................... 714/39 |
| 6,058,491 | * 5/2000 | Bossen et al. ......................... 714/15 |

* cited by examiner

*Primary Examiner*—Ly V. Hua
(74) *Attorney, Agent, or Firm*—Edmond A. Defrank; Volel Emile

(57) ABSTRACT

A method and implementing system are provided for handling detected faults in a processor to improve reliability of a computer system. An exemplary fault-tolerant on-line transactional (OLT) computer system is illustrated which includes first and second OLT processors connected to an I/O processor through a system bus. Transaction results are stored in local processor buffers and at predetermined batch intervals, the stored transactions are compared. The matched transaction results are flushed to data store while unmatched transactions are re-executed. If the same errors do not occur during a re-execution, the errors are determined to be transient and the transaction results are flushed to storage.

14 Claims, 7 Drawing Sheets

BATCH TRANSACTIONS

| TIME | PROGRAM CODE 1 | PROGRAM CODE 2 |
|---|---|---|
| 1 | READ (A) | NO OP. |
| 2 | TRANSFORM (T,A) | READ (A) |
| 3 | WRITE (A) | TRANSFORM (T,A) |
| 4 | READ (B)** | WRITE (A) |
| 5 | TRANSFORM (S,B) | READ (B) |
| 6 | READ (B) | TRANSFORM (S,B) |
| 7 | TRANSFORM (S,B) | WRITE (B) |
| 8 | WRITE (B) | READ (C) |
| 9 | READ (C) | TRANSFORM (U,C) |
| 10 | TRANSFORM (U,C) | WRITE (C) |
| 11 | WRITE (C) | |

BATCH SIZE = 10 TRANSACTIONS

| TRANSACTION | DEPENDENCY TAG | CORRUPTION TAG |
|---|---|---|
| 1 | | |
| 2 | | |
| 3 | | |
| 4 | | |
| 5 | | |
| 6 | ON | |
| 7 | | ON |
| 8 | ON | |
| 9 | ON | |
| 10 | | |

FIG. 8

NON-BATCH TRANSACTIONS

| TIME | PROGRAM CODE 1 | PROGRAM CODE 2 |
|---|---|---|
| 1 | READ (A) | NO OP. |
| 2 | TRANSFORM (T,A) | READ (A) |
| 3 | WRITE (A) | TRANSFORM (T,A) |
| 4 | NO OP. | WRITE (A) |
| 5 | READ (B)** | NO OP. |
| 6 | TRANSFORM (T,B) | READ (B) |
| 7 | READ (B) | TRANSFORM (T,B) |
| 8 | TRANSFORM (T,B) | WRITE (B) |
| 9 | WRITE (B) | NO OP. |
| 10 | NO OP | READ (C) |
| 11 | READ (C) | TRANSFORM (T,C) |
| 12 | TRANSFORM (T,C) | WRITE (C) |
| 13 | WRITE (C) | NO OP. |

FIG. 9

TIME-LAG DUPLEXING TECHNIQUES

RELATED APPLICATIONS

The present application is related to co-pending application Ser. No. 08/929,014, entitled "METHOD AND SYSTEM FOR FAULT-HANDLING TO IMPROVE RELIABILITY OF A DATA-PROCESSING SYSTEM", filed on Sep. 15, 1997, assigned to the assignee of the present application and included herein by reference.

1. Field of the Invention

The present invention relates generally to information processing systems and more particularly to a methodology and system for handling detected faults in a processor.

2. Background of the Invention

As personal computers and workstations are utilized to perform more and more substantial applications that were formerly reserved for mainframes, system availability and data integrity become increasingly important. In the prior art, a technique known as lock-step duplexing has been utilized to assure data integrity in lower priced computers. With lock-step duplexing, two processing elements are utilized for fault detection and when a mismatch is found between the two processing elements, the computer system immediately comes to a halt. In certain aspects, this is a very safe methodology as it assumes that all occurred errors are permanent. But at the same time, the associated cost of this methodology can also be very high because there is usually a long downtime for each outage. This is particularly true when the majority of errors that occurred in the field are transient in nature, making such methodology seemingly overly conservative.

As an improvement, some lock-step duplexing systems are enhanced by utilizing a "retry." More specifically, if there is a mismatch, both processing elements are retried and the result comparison is performed again. The computer system will be halted when there is a second mismatch. Accordingly, the technique of lock-step duplexing with retry can be utilized in fault detection and recovery for transient errors also. Due to the high occurrence rate of transient errors, lock-step duplexing systems with retry tend to have higher system availability than lock-step duplexing systems without retry. Still, there is a concern about data integrity exposures in all systems that are based on lock-step duplexing technique. Such concern stems from common-mode errors.

Common-mode errors (either permanent or transient), which may occur in any peripheral component of the computer system, such as memory, bus, etc., can potentially feed both lock-stepped processing elements with the same bad data and cause a data integrity violation without being detected.

Moreover, prior systems which have been implemented for error detection and recovery methodologies in systems where transactions can be loaded directly from I/O devices in non-batch mode operations are not necessarily applicable to batch mode operations.

Accordingly, there is a need for an improved and yet reasonably economical method and system for the detection, reporting, and recovery of transient errors in computer systems.

SUMMARY OF THE INVENTION

A method and apparatus is provided which enables processor error detection and handling in both batch and non-batch mode computer systems. An exemplary embodiment includes a first processor, a second processor, an I/O processor and a comparator. The leading processor uses a write check buffer in the I/O processor to temporarily store write requests. The lagging processor does only pseudo write operations by writing to its own private write buffer. After a predetermined interval, the write requests for both the leading and lagging processors are committed by flushing to disk. At flush time, the entries of the lagging processor's write buffer are compared with the I/O processor's public write check buffer. If a mismatch between the buffer entries is indicated, the respective transactions are marked as corrupted and are scheduled for re-execution.

BRIEF DESCRIPTION OF THE DRAWINGS

A better understanding of the present invention can be obtained when the following detailed description of a preferred embodiment is considered in conjunction with the following drawings, in which:

FIG. 8 is a table illustrating an exemplary operation of dependency rescheduling; and FIG. 9 illustrates an exemplary sequence of two transaction processes executing in a non-batch mode.

DETAILED DESCRIPTION

The present invention may be applicable in an information processing system having any type of processors. For the purpose of illustration, a preferred embodiment of the present invention, as described below, is implemented by utilizing reduced instruction set computing (RISC) processors, such as the PowerPC™ microprocessors, manufactured by International Business Machines Corporation.

Figure 1:
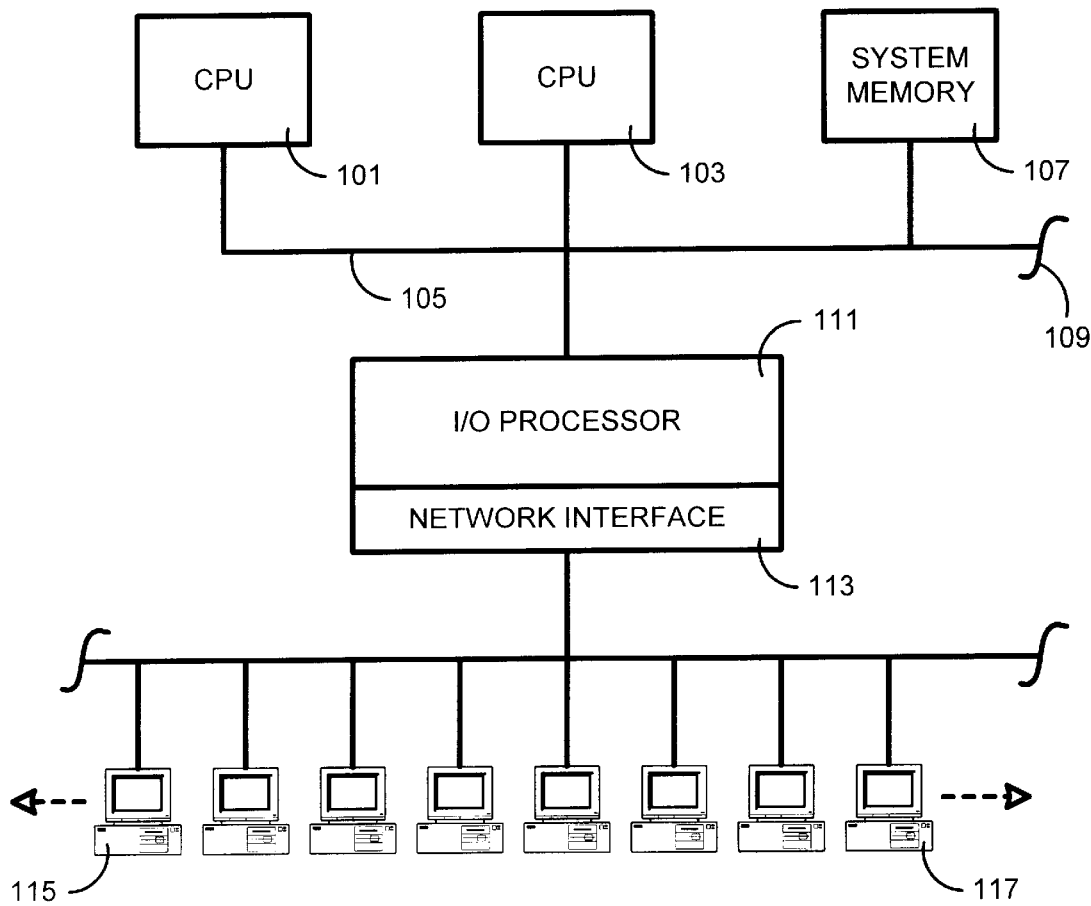
FIG. 1 is a block diagram of a fault-tolerant computer system.

Referring now to the drawings and in particular to FIG. 1, there is illustrated a block diagram of a fault-tolerant computer system. As shown, a fault-tolerant computer system includes a first processor 101 and a second processor 103. Both processors are identical and both are coupled to a system bus 105. A system memory 107 is also connected to the bus 105. The bus 105 is also arranged to be expanded 109 for connection to other system devices and circuits. An I/O processor 111 which may include a network interface 113, is shown connected to the bus 105 and also to a plurality of system terminals such as terminals 115 and 117, which are typically implemented for OLT (on-line transaction) processing systems.

Figure 2:
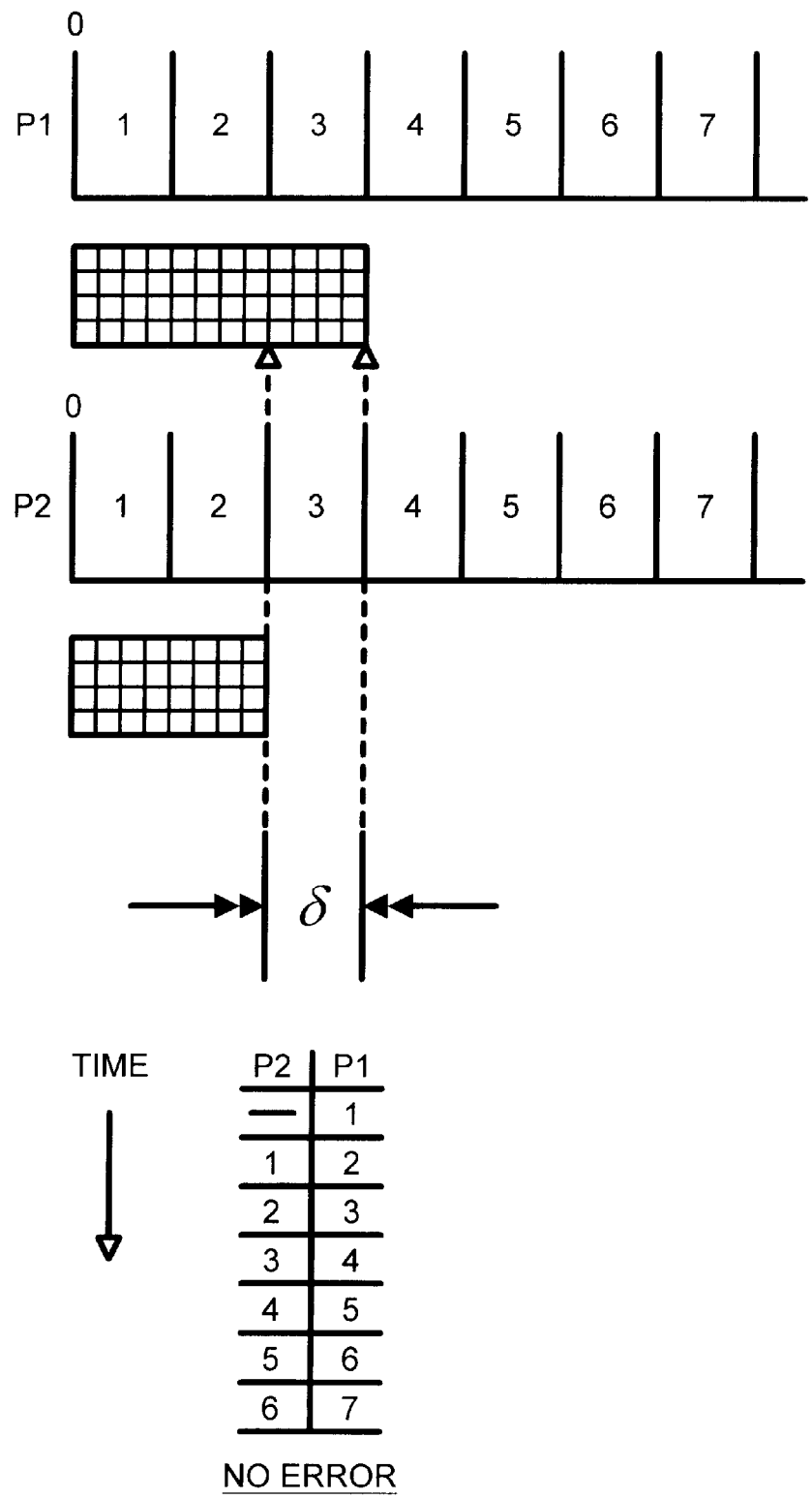
FIG. 2 graphically illustrates a time-lag computing mechanism utilized within the fault-tolerant computer system of FIG. 1.

In an exemplary time-lag computing operation, there are two processors operating in parallel in a computer system, both processors operating at the same (clock) speed, with one of two processors lagging the other in operation by a predetermined time interval. With reference now to FIG. 2, there is graphically illustrated a time-lag computing mechanism which may be utilized within the fault-tolerant computer system shown in FIG. 1. As shown, a second processor, e.g. processor 103 or "p2", lags behind a first processor, e.g. processor 101 or "p1", in operation by a fixed time interval of "δ".

Time-lag computing mechanism may be applicable at any level of granularity such as clock cycle, machine instruction, or even high-level software instruction. In other words, the fixed time interval of δ can be one (or more) clock cycle, machine instruction, or set of high-level software instruction. The choice of the granularity level depends on the type of implementation.

When the leading processor p1 reaches a checkpoint during operation, the leading processor leaves its processing results, preferably in a check/wait buffer, for the lagging processor p2 to compare. The processing results stored in the check/wait buffer will not be committed for further processing until a match is confirmed with the result at the same operational checkpoint from the lagging processor. Only when there is a match of processing results at the same operational checkpoint from the two processors will further processing be allowed.

Another choice in time-lag duplexing mechanisms is the level of the processing unit. Although the entire system can be duplicated, time-lag duplexing is most beneficial when only the processor units are duplicated as a time lag duplexing mechanism provides protection against common component transient errors (storage, bus, I/O).

Figure 3:
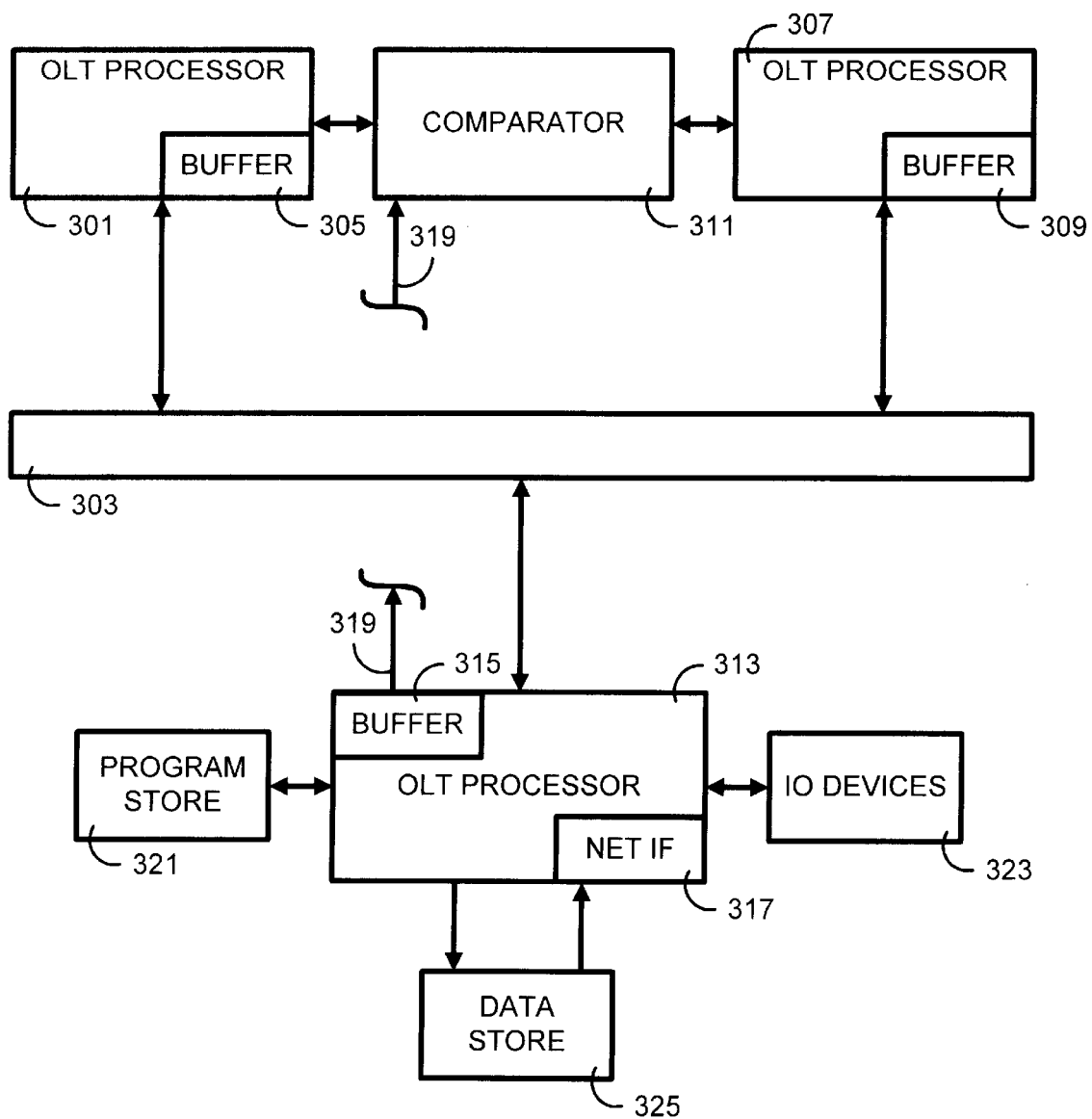
FIG. 3 is a block diagram of an OLTP (on-line transaction processor) system having a time-lag computing mechanism, in accordance with a preferred embodiment of the present invention.

Referring now to FIG. 3, there is illustrated a block diagram of an exemplary OLTP system having a time-lag computing mechanism, in accordance with a preferred embodiment of the present invention. As shown, first and second OLT processors 301 and 307 are connected to a system bus 303. OLT processors 301 and 307 also have outputs connected to a common comparator device 311. The comparator is arranged to also receive an input from a third or I/O processor 313 via connection 319. OLT processor 301 includes a buffer 305 and OLT processor 307 includes a buffer 309. The I/O processor 313 includes a buffer 315 and also a network interface connection 317. The I/O processor 313 is also connected to a program store unit 321, a data store unit 325 and I/O devices 323.

In operation, the single I/O processor 313 is the interface between the I/O activity and the transaction processors such as processors 301 and 307. The I/O processor is an ASIC (application specific integrated circuit) component which contains the switching network. The I/O processor 313 communicates with the I/O devices 323 (e.g. terminals), the program store 321 (where transaction results in a batch mode are stored) and the database or data store 325. The I/O processor 313 also communicates with the transaction processors via the system bus 303.

The transaction processors have three atomic macro-instructions, viz. (i) Read (Record-Id) which reads a pointed-to record, i.e. "Record Id", from the data store 325; (ii) Transform (Transform Record-Id) which transforms the pointed-to record, i.e. (Record Id), according to the transform (Transform); and (iii) Write Record-Id which writes a pointed-to record (Record Id) to the data store 325.

Figures 4, 5:
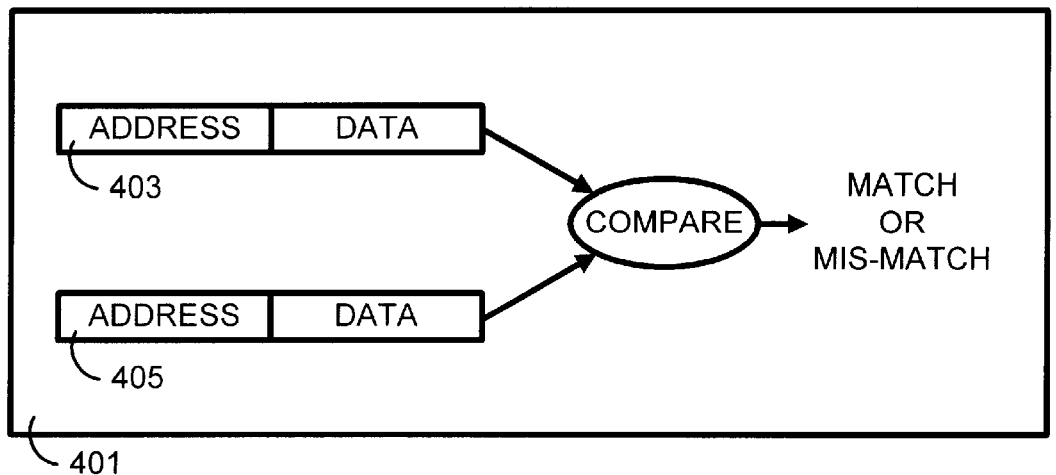
FIG. 4 is a graphical depiction of a write-check buffer associated with an I/O processor, in accordance with a preferred embodiment of the present invention.
FIG. 5 is an example sequence of two transaction processes executing in a batch mode operation.

The time-lag granularity in this mechanism is one macro-instruction as shown in FIG. 5. As a result the leading transaction processor leads the lagging transaction processor by one macro-instruction. Another important feature in this example is that a batch of macro-instructions (stored in program store 321) are a sequence of Read-Transform-Write requests. A Read-Transform-Write operation on a record compromises one transaction. A set of transactions can be loaded from the program store into the local memory of the transaction processors at execute time. Also, transactions can be loaded directly from I/O devices in only the non-batch mode.

Further, in the batch mode, as there is only one system bus 303, the write requests are buffered. The leading processor 301 uses the write-check buffer 315 in the I/O processor 313 to temporarily store the write requests. The lagging processor 307 does only pseudo writes by writing to its own private write buffer 309. After a predetermined interval (e.g. 100 transactions) both the OLT processors' write requests are committed by "flushing" to disk 325. At flush time, the entries of the lagging OLT processor's private write buffer 309 are compared with the I/O processor's public write-check buffer 315. If a mismatch between the buffer entries is indicated, the respective transactions are marked as corrupted and are scheduled for re-execution. Also, if a uncommitted record is to be read again, it must be flushed first. For additional safety, the disks can be mirrored. This protects the final write from I/O processor 313 to disk 325. If the I/O processor writes to different mirrored disks at different times, an error in a mirrored disk will be detected when the corrupted location is read. An alternative solution to the buffered write solution is to use a dual bus structure.

A special feature of this OLT processor architecture of the present example is the write-check buffer 315 on the I/O processor 313. The write-check 315 buffer is a hardened buffer and is assumed unfailing. It is used at flush time to compare write requests from the two OLT processors 301 and 307 to update the disk. There is only a small probability that the elements in this buffer are corrupted. This is because the corruption could have happened if a bus error occurred during a write request from the OLT processor to the write-check buffer 315. Even so, the corruption of this buffer 315 still prevents the disk 325 from being corrupted as a buffered flush always precedes a disk update.

In FIG. 4, there is shown a graphical depiction of a write check buffer associated with an I/O processor. A write check buffer 401 in the example is a buffer which can associatively compare the contents of its locations, such as location 403 and location 405, and indicate a match or a mismatch condition. The buffer 401 stores the write results from both transaction processes at different times in different locations. A disk or an I/O device will be updated by the write check buffer 401 only when a match is indicated between the two locations 403 and 405 in the buffer 401.

FIG. 5 shows an exemplary sequence of three transactions executing on the two transaction processors 301 and 307 in a batch mode operation. An error occurs (at time point 4) in the leading processor and is detected at a checkpoint at time point 5. At this time point, the I/O processor's write-check buffer has not committed its data to disk. The leading processor is reset to a point two checkpoints back and is retried. The lagging processor becomes the leading processor at the end of recovery. The incorrect result in the write-check buffer is not committed when the error is detected and is discarded. Subsequently, when a match confirmed the correct result is committed via a flush operation to disk. As can be seen a penalty of two time-lag intervals is incurred for a transient fault in the leading processor. In the non-batch mode, since there is no resource conflict, the disk flushing operation is not needed.

Figure 6:
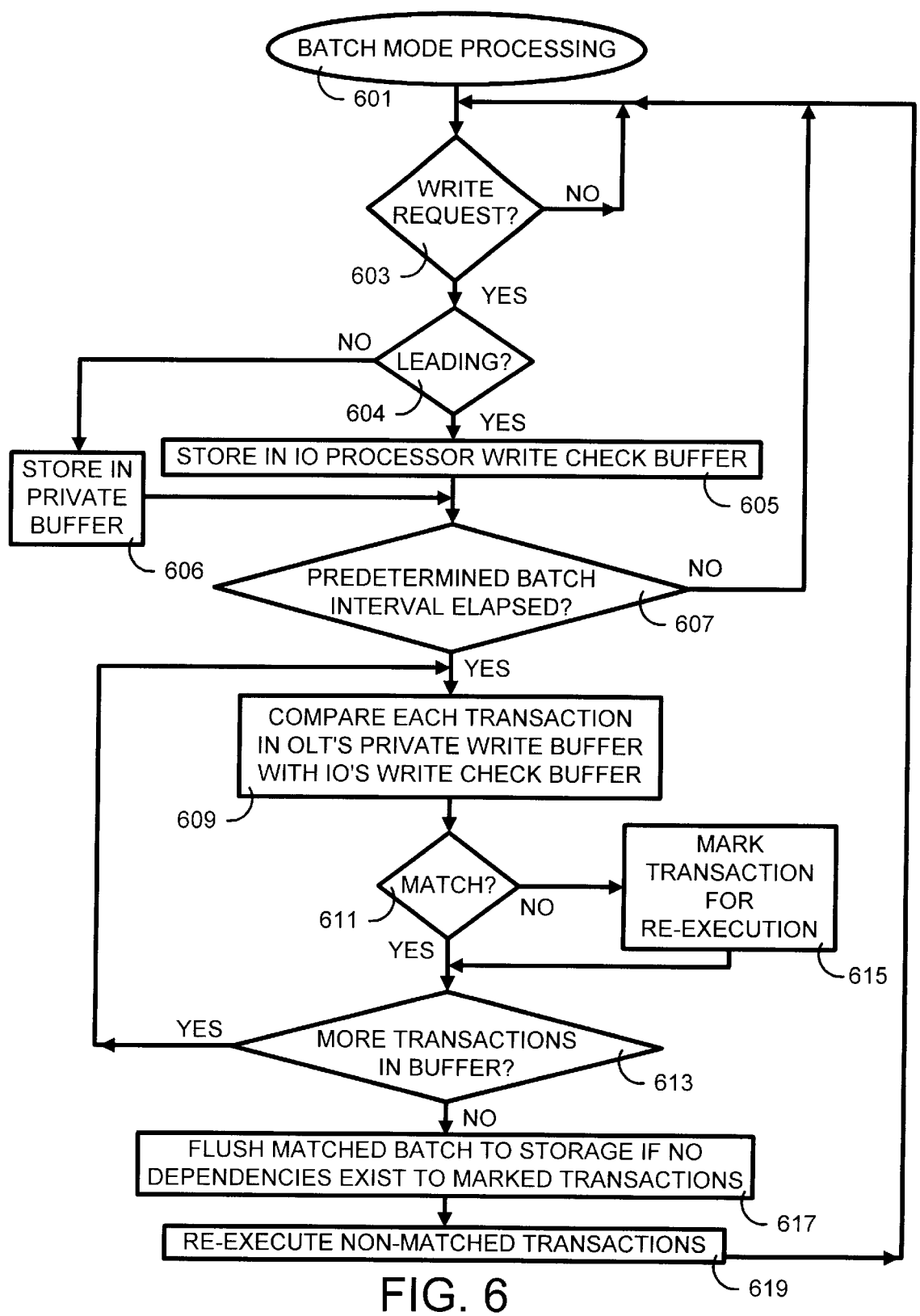
FIG. 6 is a flow chart illustrating an exemplary operational flow sequence in the FIG. 3 embodiment.

In FIG. 6, an exemplary methodology illustrates that in the batch mode 601, a determination 603 is first made as to whether the instruction is a write request. If so, and if the processor is leading 604 then the instruction is stored 605 in the write check buffer 315 of the I/O processor 313. If the processor is not leading 604, the instruction is stored in the private buffer 606. This process continues until a predetermined interval has elapsed 607 (depending on the granularity and the application), at which time each transaction result in the batch of transaction results stored in either OLT's private write buffer 305 or 307 is compared 609 with the I/O processor's write check buffer 315. For each comparison, if there is no match 611, the process marks the transaction for re-execution 615, and then, if there are more transactions in the buffer 613, the cycle is repeated. When there are no more transactions 613, the matched batch, i.e. those that have been compared and matched, are flushed or stored 617 in storage 325 if no dependencies to unmatched transactions exist. If dependencies exist, the dependent transactions are treated as unmatched transactions. At that time the unmatched transactions are re-executed 619. If the detected errors are transient, they will not repeat during the re-execution and after comparison and matching, the matched transactions will be flushed to data store 325.

Figure 7:
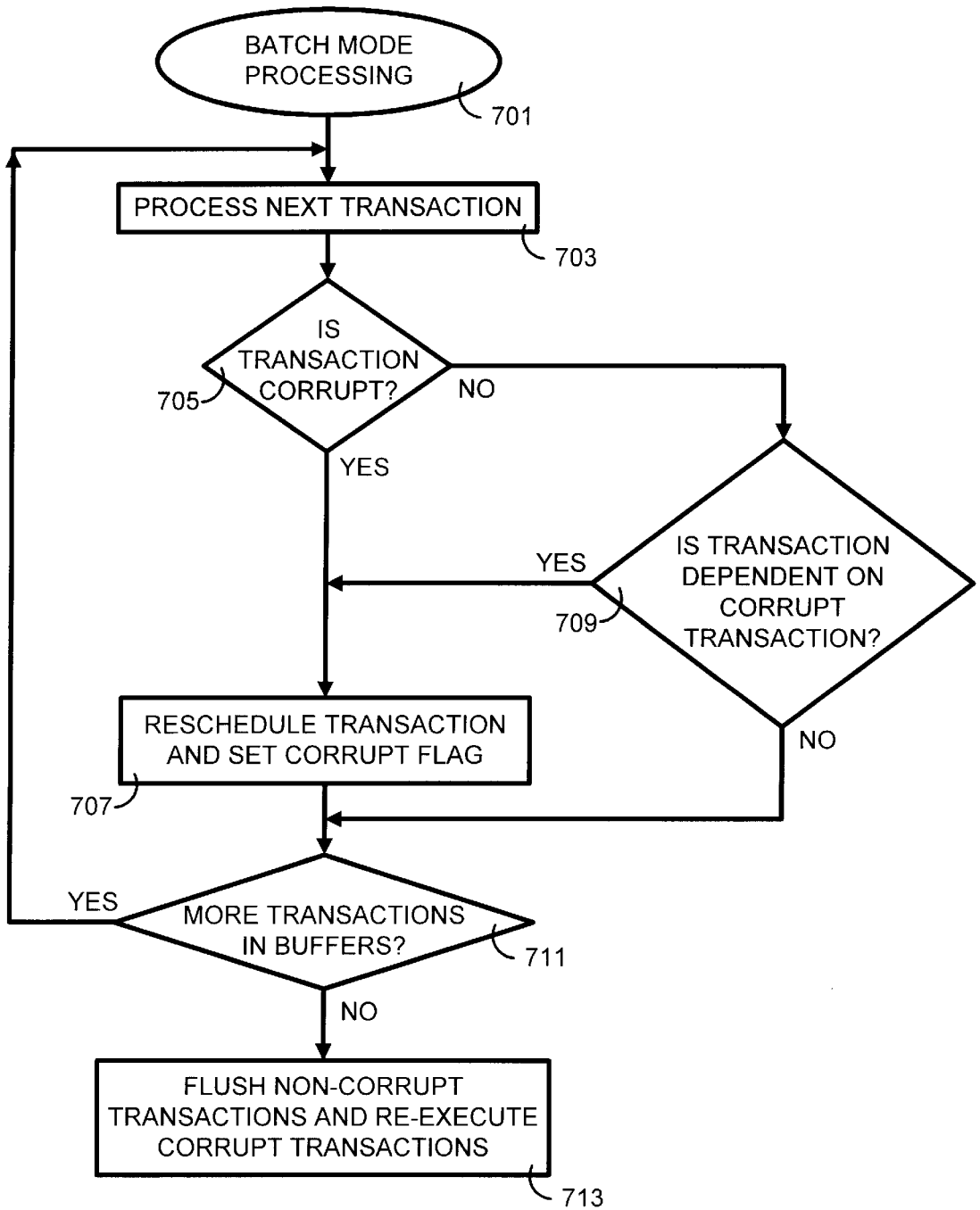
FIG. 7 is a flowchart illustrating a dependency extension of the flow shown in FIG. 6.

FIG. 7 is a flowchart illustrating an exemplary instruction dependency extension of the flow shown in FIG. 6. In the batch mode 701, as each transaction is processed 703, it is determined if each transaction is corrupt 705. If there is no match between the results in the OLT's private write buffer (e.g. 305 or 309) with the results in the I/O write check buffer (e.g. 315), then the transaction is considered to be "corrupt". If it is determined that the transaction is not corrupt, then a further determination is made as to whether the transaction is dependent on a corrupt transaction 709. If the current transaction is dependent upon a corrupt transaction (i.e. a "corrupt-dependent" tag is set) or the current transaction is corrupt, then the transaction is rescheduled 707 and a "corrupt" flag is set. If the transaction is neither corrupt 705 nor is dependent upon a corrupt transaction 709, then if there are more transactions in the buffers to batch process 711, the processing steps are applied to the next transaction. When the batch has completed and there are no more transactions in the buffers 711 then the non-corrupt transactions are flushed to memory and the corrupt transactions, together with the transactions which are considered corrupt because they depend from a corrupt transaction, are re-executed. Thereafter, if transaction results match, then the error is considered to be transient in nature and the processing continues. If the transaction results do not match after a predetermined number of re-tries, then higher level of corrective action may be invoked.

FIG. 8 is a table illustrating an exemplary operation of dependency rescheduling. As shown in FIG. 8, for a batch size of ten transactions, if a transaction has a dependency tag set, it means that the instruction depends from a result of a previous instruction. For example, transaction #6 has a "dependency" tag ON, then transaction #6 depends on one or more of the previous transactions #1 through #5. Since none of the first five transactions are corrupt, their respective corrupt tags are not set. However, as shown, the corruption tag for transaction #7 is set meaning that transaction #7 has been determined to be corrupt and there was no match between processor results. Accordingly, transactions #8 and #9, which depend from transaction #7, must also be considered corrupt. Thus, after batch processing the ten transactions, transactions #1 through #6 and transaction #10 will be flushed to disk, but transactions #7 through #9 will be re-executed.

FIG. 9 illustrates an exemplary sequence of three transactions executing on the two transaction processors 301 and 307 in a non-batch mode operation. An error occurs (at time point 5) in the leading processor and is detected at a checkpoint at time point 6. At this time point, the I/O processor's write-check buffer has not committed its data to disk. The leading processor is reset to a point two checkpoints back and is retried. The lagging processor becomes the leading processor at the end of recovery. The incorrect result in the write-check buffer is not committed when the error is detected and is discarded. Subsequently, when a match is confirmed, the correct results are written to disk. As illustrated, in the non-batch mode, write transactions and read transactions do not occur at the same time over a single bus and "NO OP" periods (no operation) result.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The methodology may also be implemented solely or partially in program code stored in memory or on a CD, disk or diskette (portable or fixed), or other memory or storage device, from which it may be executed to function as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A computer system comprising:
    a first processor coupled to a system bus for producing a first output;
    a second processor coupled to said system bus, said second processors being arranged for producing a second output, said first and second processors being arranged for performing like transactions with one of said first and second processors being a leading processor and another of said first and second processors being a lagging processor at any point in time, whereby said leading processor produces a first transaction output prior in time to a corresponding transaction output produced by said lagging processor;
    a third processor coupled to said system bus, said first, second and third processors including corresponding first, second and third buffer memories, respectively;
    said leading processor being selectively operable for using said third buffer memory to temporally store write request transactions.

2. The computer system as set forth in claim 1 wherein said lagging processor is selectively operable for storing write transaction results to said buffer memory of said lagging processor.

3. The computer system as set forth in claim 1 and further including a comparator coupled to said system bus, and a storage device coupled to said third processor, wherein, transaction results from said leading processor and said lagging processor are compared by said comparator, said third processor being selectively operable for flushing transaction results to said storage device when transaction results form said leading processor and said lagging processor are matched.

4. The computer system as set forth in claim 3 and further including means for marking transactions as corrupt when a comparison of transaction results from said leading processor and said lagging processor are unmatched.

5. The computer system as set forth in claim 4 and further including means for scheduling re-execution of transactions which are unmatched.

6. The computer system as set forth in claim 5 and further including means for marking transactions as dependent when such transactions are determined to be dependent upon results from a prior transaction.

7. The computer system as set forth in claim 6 including means for scheduling re-execution of transactions marked as dependent transactions when such transactions are determined to depend from transactions marked as corrupt transactions.

8. A method for handling processor errors comprising:
    operating a leading processor to process computer transactions;
    operating a lagging processor to process said computer transactions at predetermined time lag following processing of said computer transactions by said leading processor;
    using a lagging buffer associated with said lagging processor to store write transaction requests processed by said lagging processor;
    using an I/O buffer in an I/O processor to temporally store corresponding write transaction requests processed by said leading processor; and
    comparing write transaction requests from said lagging processor buffer with corresponding requests from said I/O buffer to determine if said transaction requests match.

9. The method as set forth in claim 8 wherein said comparing is accomplished on a transactional basis each time a transaction is processed.

10. The method as set forth in claim 8 wherein said comparing is accomplished on a batch basis such that the comparing is performed after results from a predetermined number of corresponding transactions have been stored in said lagging buffer and said I/O buffer.

11. The method as set forth in claim 10 and further including:
    marking transactions as corrupt when a comparison of transaction results from said leading processor and said lagging processor produce an unmatched result.

12. The method as set forth in claim 11 and further including:
    scheduling re-execution of transactions marked as corrupt.

13. The method as set forth in claim 12 and further including:
    marking transactions as dependent when such transactions are determined to be dependent upon results from a prior transaction.

14. The method as set forth in claim 13 and further including:
    scheduling re-execution of transactions marked as dependent transactions when such transactions are determined to depend from transactions marked as corrupt transactions.

\* \* \* \* \*